(12) United States Patent
Britz

(10) Patent No.: US 10,004,213 B2
(45) Date of Patent: Jun. 26, 2018

(54) MEASURING DEVICES FOR FISHING

(71) Applicant: Scott A. Britz, Evart, MI (US)

(72) Inventor: Scott A. Britz, Evart, MI (US)

(*) Notice: Subject to any disclaimer, the term of this patent is extended or adjusted under 35 U.S.C. 154(b) by 181 days.

(21) Appl. No.: 15/214,739

(22) Filed: Jul. 20, 2016

(65) Prior Publication Data

US 2016/0324133 A1 Nov. 10, 2016

Related U.S. Application Data

(63) Continuation-in-part of application No. 14/479,361, filed on Sep. 7, 2014, now abandoned.

(60) Provisional application No. 61/875,329, filed on Sep. 9, 2013.

(51) Int. Cl.
| A01K 87/00 | (2006.01) |
| G01G 19/14 | (2006.01) |
| A01K 87/08 | (2006.01) |
| A01K 97/00 | (2006.01) |

(52) U.S. Cl.
CPC ............ *A01K 87/007* (2013.01); *A01K 87/08* (2013.01); *A01K 97/00* (2013.01); *G01G 19/14* (2013.01)

(58) Field of Classification Search
CPC .. A01K 87/007; G01G 19/60; G01G 23/3742; G01G 19/14; G01B 3/10; G01B 3/1056; G01B 2003/1069
See application file for complete search history.

(56) References Cited

U.S. PATENT DOCUMENTS

| 2,003,893 A * | 6/1935 | La Pan ................ A01K 87/007 177/148 |
| 2,603,474 A * | 7/1952 | Mandolf .................. G01G 3/02 177/126 |
| 2,750,184 A * | 6/1956 | Warndahl ............... A01K 87/08 177/127 |
| 3,803,742 A | 4/1974 | Foster |
| 4,995,188 A | 2/1991 | Ewing |
| 6,429,391 B1 * | 8/2002 | Gruver .................. G01G 19/14 177/148 |
| 7,173,197 B1 * | 2/2007 | Kasperek ............... A01K 97/00 177/131 |
| 7,408,125 B2 | 8/2008 | Lentine |
| 7,605,332 B2 | 10/2009 | Winkler |
| 9,020,416 B2 | 4/2015 | Wills |

(Continued)

OTHER PUBLICATIONS

Kickstarter-Campaign—The World's Smartest Tape Measure BagelLabs—Launch date Jun. 29, 2016/url-https://www.kickstarter.com/projects/bagel-labs/bagel-the-worlds-smartest-tape-measure.

*Primary Examiner* — Joanne Silbermann

(74) *Attorney, Agent, or Firm* — Olav M. Underdal; IDP Patent Services

(57) ABSTRACT

A fishing rod with convenient devices for measuring a length and a weight of a fish, includes a display; a weight sensor, a measuring control unit, including a processor, a non-transitory memory, an input/output, a weighing manager, a communication manager, and a data bus; a measuring assembly, including an assembly body, an axle, a spring-loaded mechanism, and a retractable hook connector; a weighing hook, and a cavity for storing the weighing hook, wherein the retractable hook connector, is configured to show a length between a lower end of the fishing rod and a lower end of the weighing hook. The retractable hook connector can be a retractable tape measure or a retractable cord.

20 Claims, 13 Drawing Sheets

(56) References Cited

U.S. PATENT DOCUMENTS

| | | | | |
|---|---|---|---|---|
| 2002/0017048 A1* | 2/2002 | Lam | ............... | A01K 97/00 |
| | | | | 43/4 |
| 2002/0195282 A1* | 12/2002 | Thadani | ............ | G01G 19/14 |
| | | | | 177/148 |
| 2009/0084020 A1* | 4/2009 | Sorey | ............... | A01K 97/00 |
| | | | | 43/25 |
| 2015/0316409 A1 | 11/2015 | Castaneda et al. | | |

\* cited by examiner

System for Weight Measurement

Measuring Control Unit

MEASURING DEVICES FOR FISHING

CROSS-REFERENCE TO RELATED APPLICATIONS

This application is a continuation-in-part of U.S. Non-Provisional application Ser. No. 14/479,361, filed Sep. 7, 2014, which claims the benefit of U.S. Provisional Application No. 61/875,329, filed Sep. 9, 2013.

FIELD OF THE INVENTION

The present invention relates generally to the field of fishing tackle and accessories and more particularly to measurement devices for fishing and fishing rods with a built-in measuring device.

BACKGROUND OF THE INVENTION

Most sport fishers can confirm that obtaining a quick weight and length measurement of a freshly caught fish, without being forced to put down the fishing rod, would be desirable.

A sport fisher may be in a location where putting down the fishing rod may present various problems, such as tall grass, or a steep, muddy riverbank where the rod might slide into the water. There is always a risk that the exposed fishing line on the rod may become entangled with objects on the ground.

A fishing rod with a built-in scale in the handle for weighing the fish, and numbered striations down the length of the rod itself so that it may be used as a measuring stick for the length, would satisfy this demand.

The rod may also feature a connection capability with the Internet via any one of several wireless data protocols, such as Bluetooth™, to facilitate the transfer of length and weight data to a computer or smartphone, and may also feature a port for the installation of a memory card.

As such, considering the foregoing, it may be appreciated that there continues to be a need for novel and improved devices and methods for extending the use of a fishing rod with a measuring device.

SUMMARY OF THE INVENTION

The foregoing needs are met, to a great extent, by the present invention, wherein in aspects of this invention, enhancements are provided to the existing model of a fishing rod.

In an aspect, the invention is directed to a fishing rod with built-in devices to measure the length and weight of a fish. The rod features a built-in scale in the handle for weighing the fish, and numbered striations down the length of the rod itself so that it may be used as a measuring stick for the length. Measurements are provided in both English and metric systems.

In a related aspect, the scale features a digital weight display, and a weighing hook at the end of a cord, which may be stored in a cavity within the handle, and extended when needed.

In another related aspect, the rod may also feature a connection capability with the Internet via any one of several wireless data protocols, such as Bluetooth™, to facilitate the transfer of length and weight data to a computer or smartphone, and may also feature a port for the installation of a memory card.

In an aspect, a fishing rod with convenient devices for measuring a length and a weight of a fish, can include:
a) a digital display;
b) a weight sensor;
c) a measuring control unit, which is connected to the weight sensor and is configured to output weight measurement data via a connection to the digital display;
d) a measuring assembly, comprising:
an assembly body, which is connected to the weight sensor;
an axle, which is rotatably connected to the assembly body;
a spring-loaded mechanism, which is configured with a locking function; and
a retractable hook connector, which is configured to roll-up around the axle when the retractable hook connector is retracted;
e) a weighing hook, which is connected to an outer end of the retractable hook connector;
wherein the fishing rod further comprises a handle, such that the digital display, the weight sensor, the measuring control unit, and the measuring assembly are mounted in the handle;
wherein the measuring control unit is configured to receive the weight measurement from the weight sensor, when the fish is hanging from the weighing hook and the spring loaded mechanism is locked;
wherein the retractable hook connector, is configured to show a length between a lower end of the fishing rod and a lower end of the weighing hook.

In a related aspect, the retractable hook connector can be a retractable tape measure, which comprises length measurement markings, such that the retractable tape measure is configured to show a length between a lower end of the fishing rod and a lower end of the weighing hook, when the retractable tape measure is extracted from the measuring assembly.

In an aspect, a measuring device with convenient features for measuring a length and a weight of a fish, can include:
a) a device body;
b) a digital display;
c) a weight sensor;
d) a measuring control unit, which is connected to the weight sensor and is configured to output weight measurement data via a connection to the digital display;
e) a measuring assembly, which can be configured as a self-retracting tape measure, including:
an assembly body, which is connected to the weight sensor;
an axle, which is rotatably connected to the assembly body;
a spring-loaded mechanism, which is configured with a locking function; and
a retractable hook connector, which is configured to roll-up around the axle when the retractable hook connector is retracted;
f) a weighing hook, which is connected to an outer end of the retractable hook connector;
such that the digital display, the weight sensor, the measuring control unit, and the measuring assembly are mounted in the device body;
wherein the retractable hook connector, is configured to show a length between a lower end of the fishing rod and a lower end of the weighing hook.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
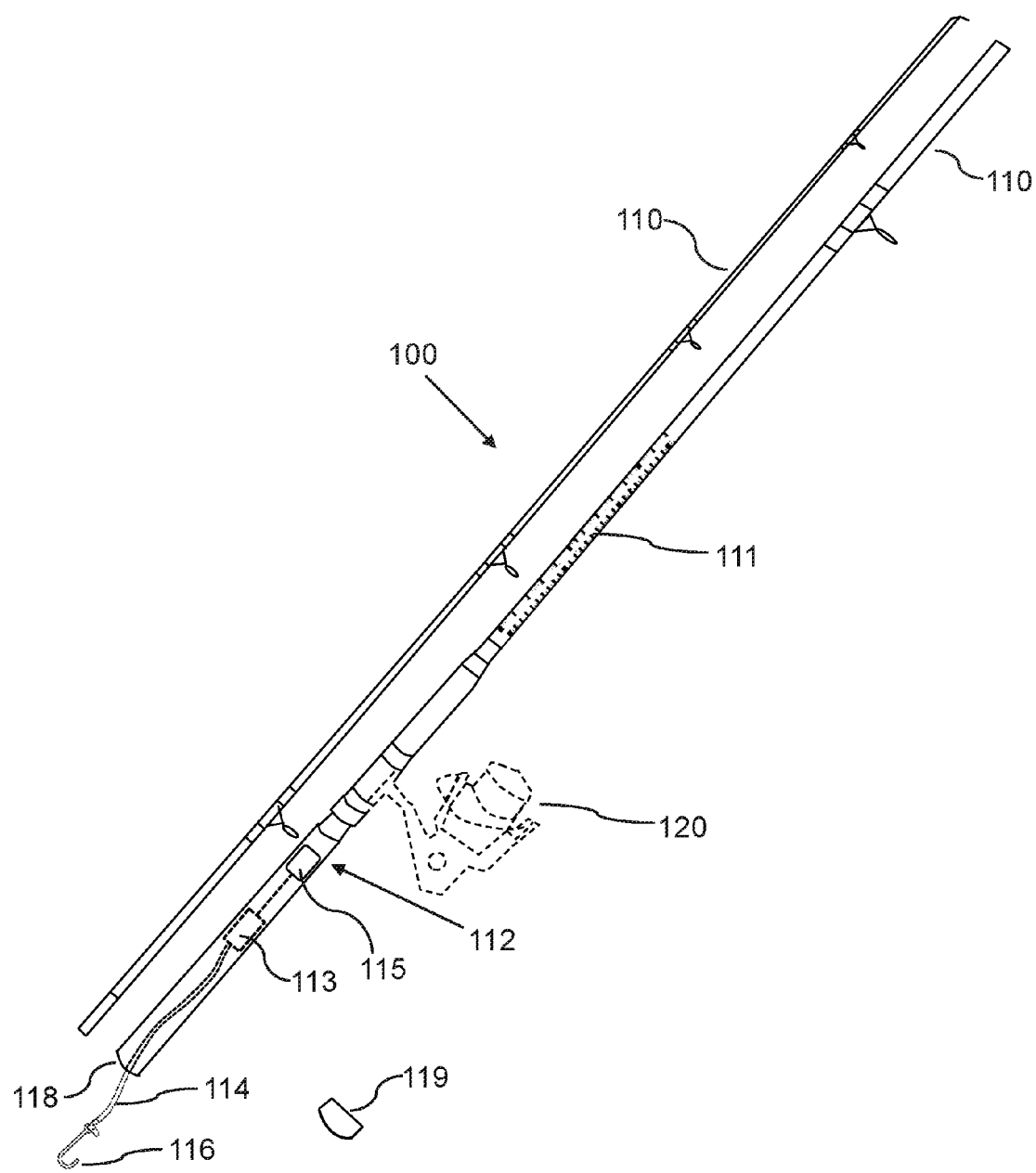
FIG. 1 is a schematic diagram illustrating a fishing rod, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a fishing rod 100 with reference to FIG. 1, in such manner that like reference numerals refer to like components throughout; a convention that we shall employ for the remainder of this specification.

Referring now to the invention in more detail, the invention is directed to a fishing rod 100 with built-in devices to measure the length and weight of a fish.

In a related embodiment, the fishing rod 100 can include:
a) a weight sensor 113 for weighing a fish, which can also be referred to as a load cell 113, which can for example be a strain gauge load cell or a piezoelectric load cell;
b) a weight display 115, which is connected to the weight sensor 113;
c) a cord 114, that is connected to the weight sensor 113 at a first end of the cord 114;
d) and a weighing hook 116, which is connected to a second end of the cord 114.

In a related embodiment, the weighing hook 116 and the cord 114 can be stored in a cavity 118 within the handle 112, and extended from the cavity 118 when needed to weigh a fish.

Figure 8:
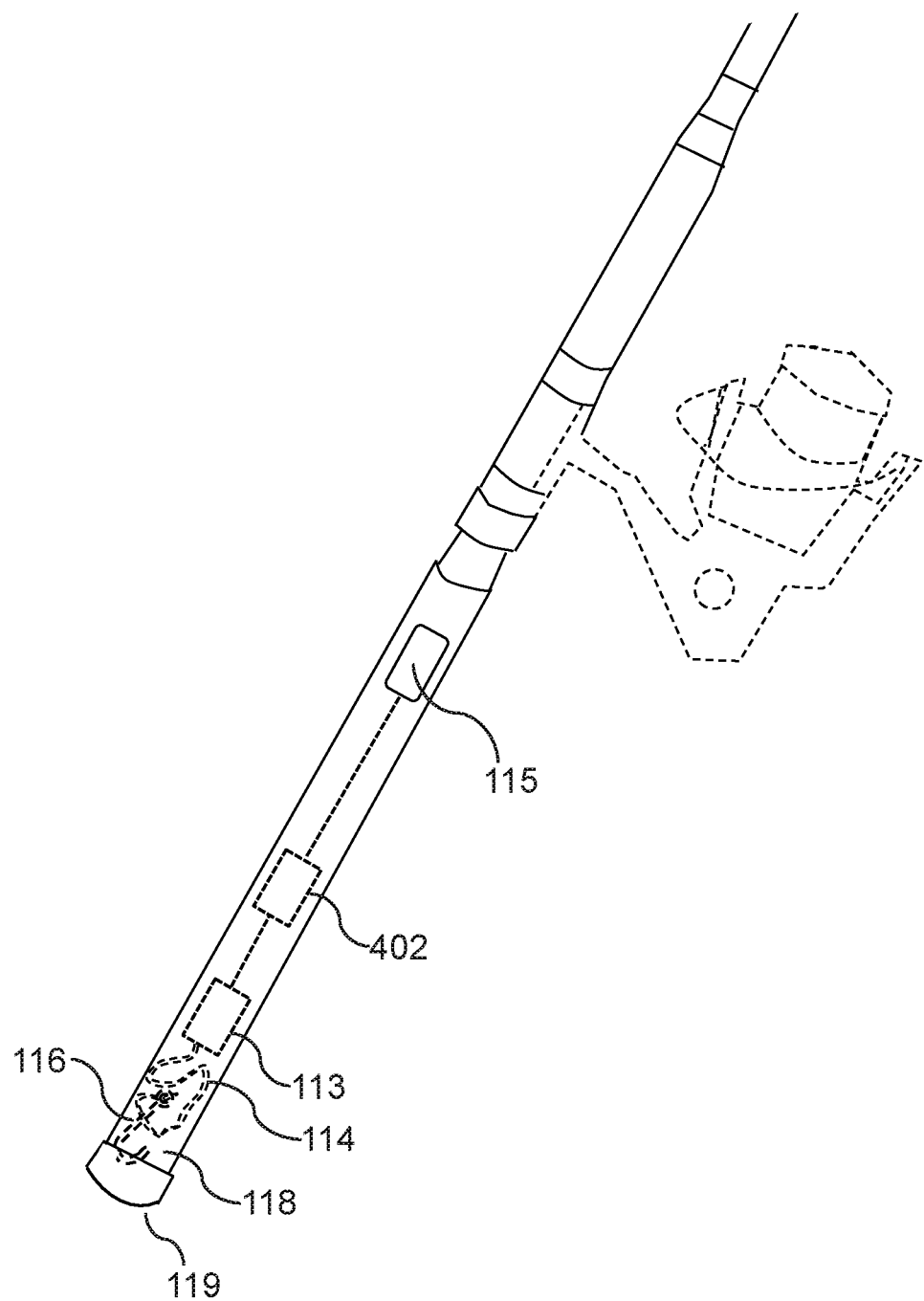
FIG. 8 is a schematic diagram illustrating a part of a fishing rod, according to an embodiment of the invention.

In a related embodiment, the fishing rod 100 can further include a cap 119, such that the cap can close the cavity 118, when the weighing hook 116 and the cord 114 are stored in the cavity 118, such as shown in FIG. 8.

In a related embodiment, the cap 119 can be threaded.

In a related embodiment, the weight sensor 113 can be placed inside the handle 112 of the fishing rod 100, and the digital weight display 115 can be placed on a surface of the handle 112. In FIG. 1, the weight sensor 113 is shown in short dashed lines, to indicate it is inside the handle 112.

In a related embodiment, the fishing rod 100 can further include length measurement markings 111, which can be marked on an elongated member 110 of the rod 100, such that it can be used as a measuring stick to measure the length of a fish.

In a further related embodiment, the length measurement markings 111 can further include number markings.

Figure 2:
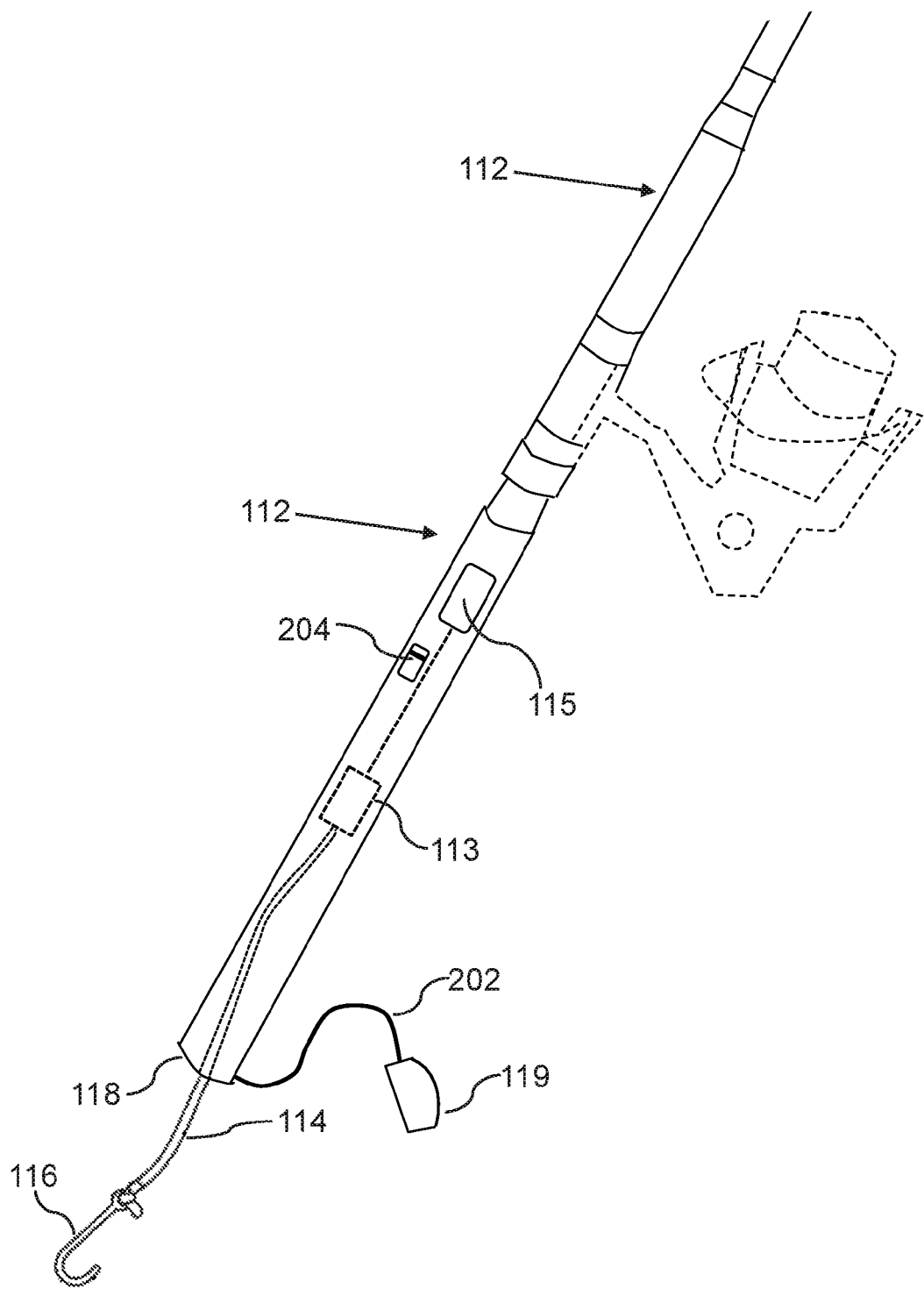
FIG. 2 is a schematic diagram illustrating a part of a fishing rod, according to an embodiment of the invention.

FIG. 2 Illustrates a partial close-up view of the fishing rod 100, showing the handle 112, the weight sensor 113, the weight display 115, the cord 114, and the weighing hook 116.

A first example embodiment can include the handle 112 with the cavity 118 to store the weighing hook 116, a cord 114, a digital weight display 115, a built-in scale in the handle for weighing a fish, and a threaded cap 119. Further, the fishing rod 100 can include numbered markings 111 down the length of the elongated member 110 of the rod 100, such that it can be used as a measuring stick to measure the length of the fish. Measurements can be provided in both English and metric systems.

Figure 3:
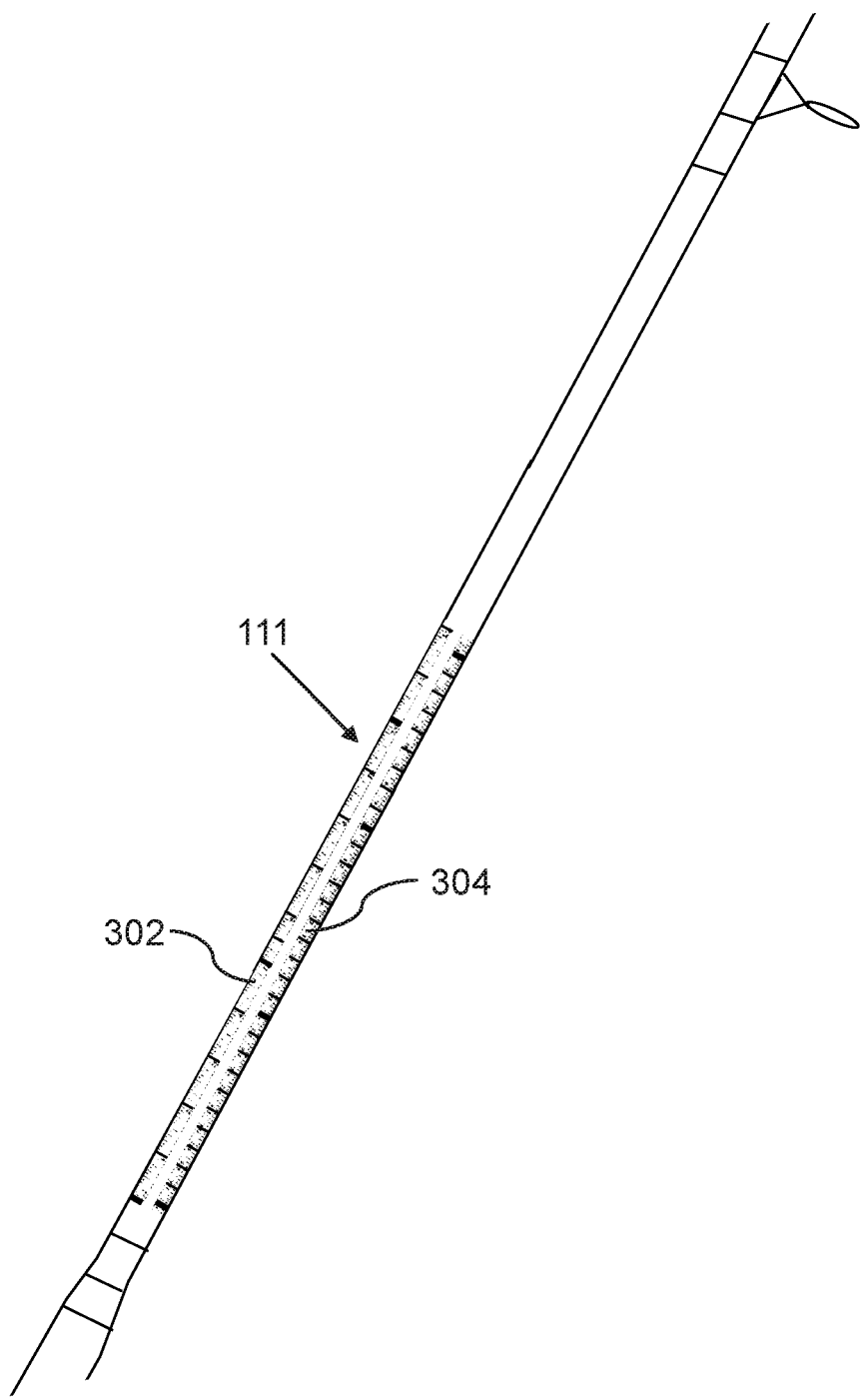
FIG. 3 is a schematic diagram illustrating a part of a fishing rod, according to an embodiment of the invention.

FIG. 3 illustrates a partial close-up view of the fishing rod 100, showing the markings 111, further comprising English system markings 302 and metric system markings 304.

In a related embodiment, the English system markings 302 can have an appearance that is clearly different from the metric system markings 304, to facilitate an accurate reading by the user.

In a further related example embodiment, the English system markings 302 can be in a first color, and the metric system markings 304 can be in a second color, such that the first color is contrasting to the second color.

In a second example embodiment, the fishing rod 100 can have a battery-powered scale with a digital weight display 115, located in the handle 112. The cavity 118, containing the weighing hook 116, is covered by a threaded cap 119 when the scale is not in use. To prevent loss, the threaded cap can be tethered to the handle with a short length of cord or light chain 202.

In a related embodiment, as illustrated in FIG. 2, an on/off switch 204 to activate and deactivate the weight sensor 113 and the weight display 115 can be located on the handle 112.

In related embodiments, the weight sensor 113 and the weight display 115 can be:
  a) Mechanical, such that both the weight sensor 113 and the weight display 115 are mechanical devices connected via a mechanical connection. In some related embodiments the weight sensor 113 and the weight display 115 can be parts of one device;
  b) Digital, such that the weight sensor 113 is a digital weight sensor, which is an electronic digital device, and the weight display 115, is a digital weight display, such as an LCD screen.

In a further related embodiment, the digital weight display 115 can support touch functionality.

To use the first example embodiment, a user removes a freshly caught fish from a fishing hook, unscrews the threaded cap, and pulls the weighing hook 116 out of the cavity 118. The user then hangs the fish from the weighing hook 116 and activates the on/off switch 204 to obtain the weight from the digital weight display 115. In a related embodiment, the weight sensor 113 and weight display 115 can be activated automatically when a force is applied to the weight sensor 113, via the cord 114.

To use the second exemplary embodiment, the user removes the freshly caught fish from the fishing hook, measures the fish using the markings 111 on the rod 100, removes the cap 119, and pulls the weighing hook 116 out of the cavity 118. The user then hangs the fish from the weighing hook 116 and activates the on/off switch 204 to obtain the weight from the digital weight display 115.

The fishing rod 100 can be manufactured in a number of variants well known in the art of fishing rods. FIG. 1. shows the fishing rod 100 in the form of a spinning rod, with a spinning reel 120 mounted. In other variants, the fishing rod 100 can include a fly rod, an ice fishing rod, a deep sea fishing rod, a surf casting rod, a dapping rod, and any other type of fishing rod.

The fishing rod 100 can be manufactured in one piece, in two pieces, as shown in FIG. 1, or in a plurality of pieces.

The fishing rod 100 comprises a flexible elongated member 110, sometimes called a blank, which can be a length of glass fiber, glass fiber composite, carbon fiber composite, carbon fiber, bamboo, split cane bamboo, Kevlar composite, or other suitable material.

The handle 112 can be manufactured of a flexible, durable material such as cork, foam rubber, silicone, rubber, plastic, or combination thereof. The handle 112 can partially or fully expose the elongated member/blank 110, and can be in one piece, or in two or more pieces.

The weighing hook 116 can be manufactured from a rigid, durable material such as aluminum, steel, stainless steel, or plastic.

The cap 119 can for example be manufactured from a rigid, durable material such as aluminum, steel, stainless steel, or plastic.

The cord 114 can be manufactured from a flexible, durable fibrous material, such as plastic or nylon.

Components, component sizes, and materials listed above are preferable, but artisans will recognize that alternate components and materials could be selected without altering the scope of the invention.

Figure 7:
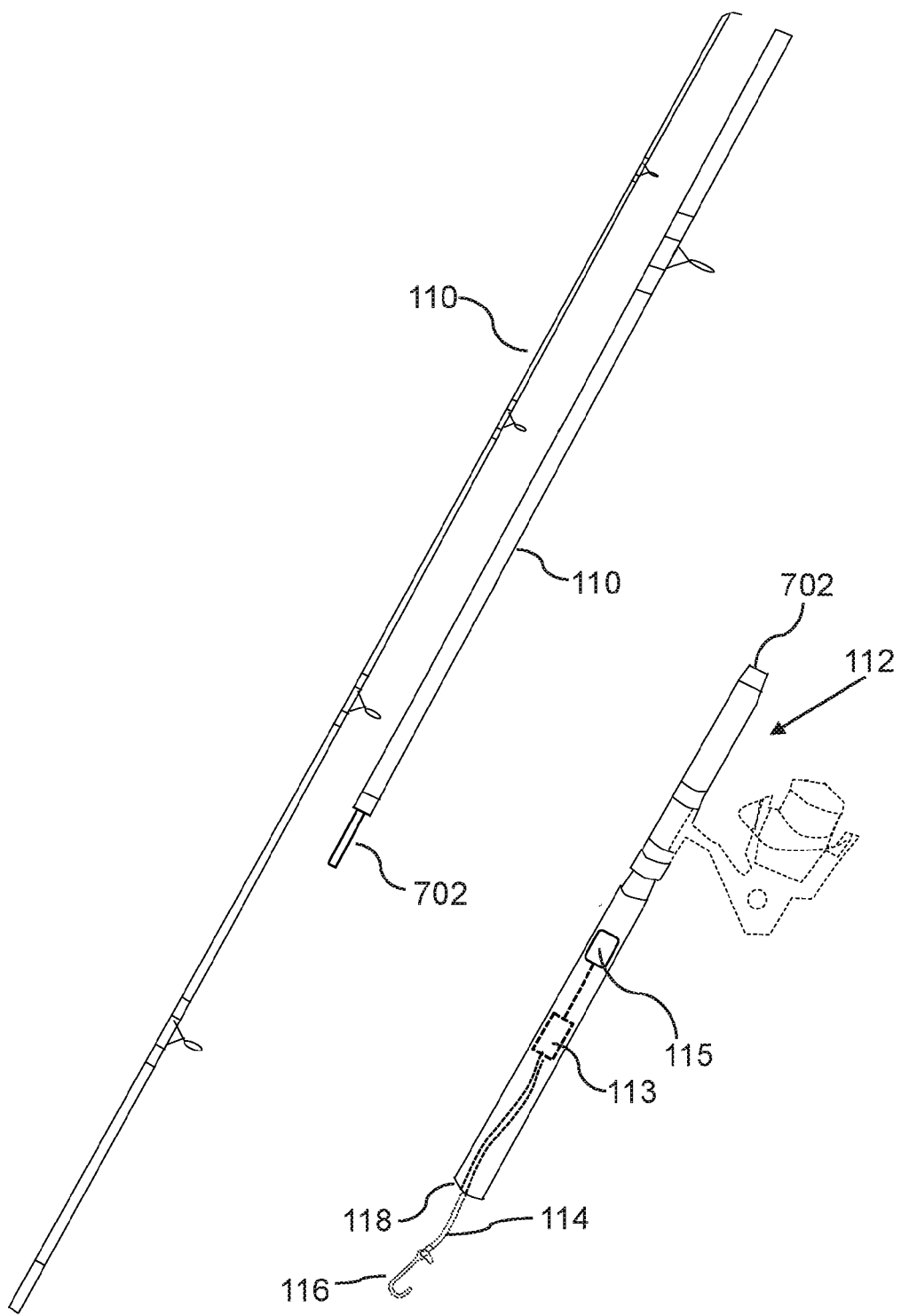
FIG. 7 is a schematic diagram illustrating a fishing rod, according to an embodiment of the invention.

In an embodiment, as illustrated in FIG. 7, the handle 112 can be detachable, such that the handle with the inbuilt weighing system can be attached with an attachment mechanism 702 to different elongated members 110 to form a fishing rod 100. The attachment mechanism 702 can include a threaded attachment, such that the handle screws into or onto the elongated member 110, or it can include different forms of ferrule or slide-in or slide-on attachment mechanisms, including a spigot ferrule as shown in FIG. 7.

In another embodiment, the rod can also include a connection capability with a wireless connection, such as Bluetooth™, to facilitate the transfer of length and weight data to a computer or smartphone, and can also feature a port for the installation of a memory card.

Figure 4:
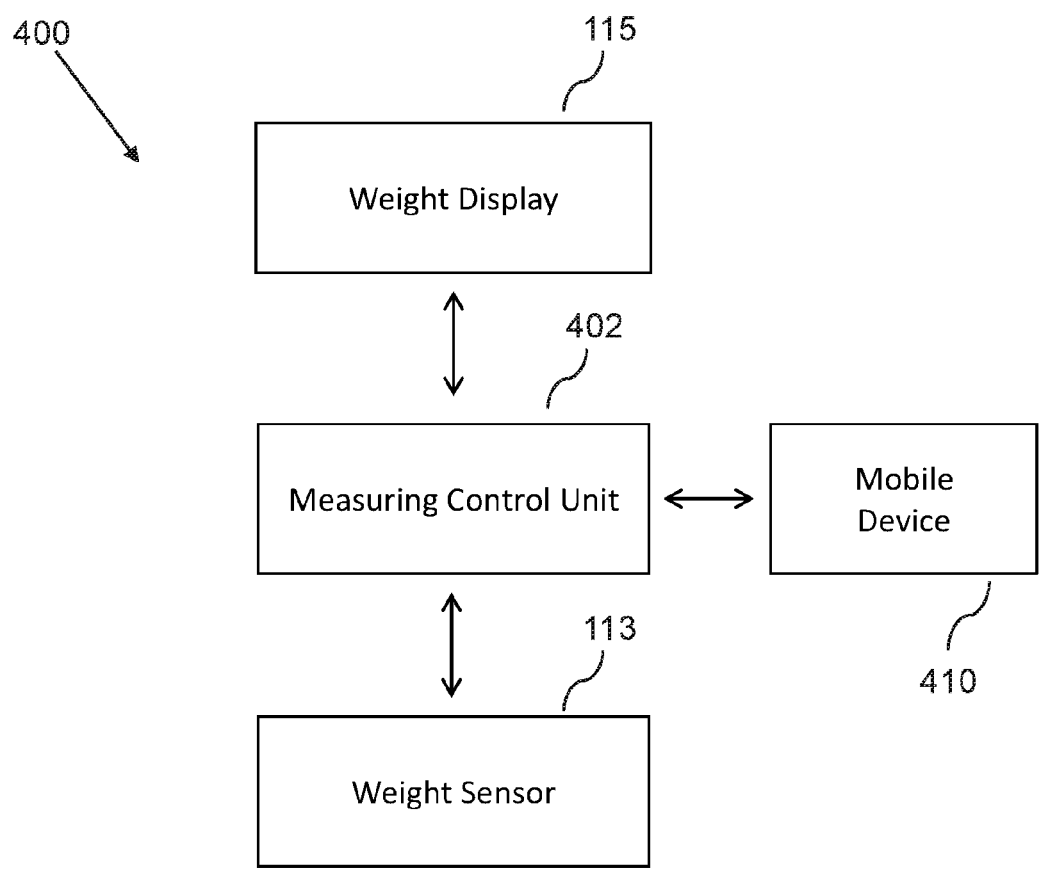
FIG. 4 is a schematic diagram illustrating a system for measurement, according to an embodiment of the invention.

In a related embodiment, FIG. 4 illustrates a system for weight measurement 400, including:
  a) A digital display 115;
  b) A weight sensor 113, which can also be referred to as a load cell 113, which can for example be a strain gauge load cell or a piezoelectric load cell;
  c) A measuring control unit 402; which is connected to the weight sensor 113, and can output weight measurement data and other information via a connection to the digital display 115;
  Such that the measuring control unit 402 can communicate with a mobile device 410, such that the mobile device can receive input from the measuring control unit 402 and can control functions on the measuring control unit 402.

Figure 5:
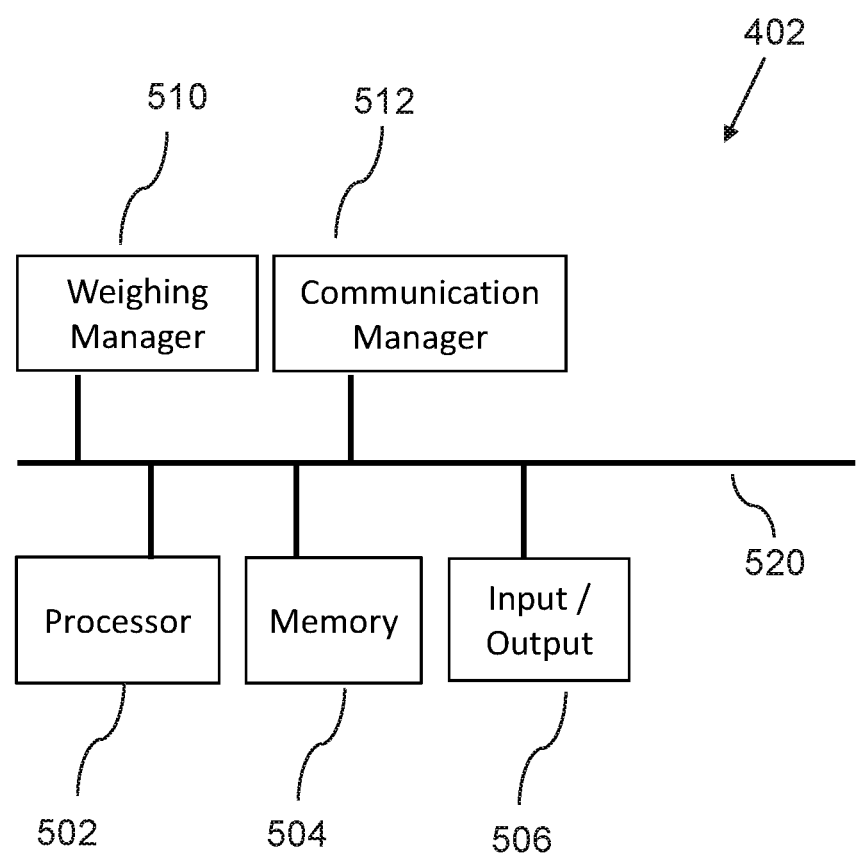
FIG. 5 is a schematic diagram illustrating a measuring control unit, according to an embodiment of the invention.

In a related embodiment, as shown in FIG. 5, the measuring control unit 402 can include:
  a) A processor 502;
  b) A non-transitory memory 504;
  c) An input/output 506;
  d) A weighing manager 510; and
  e) A communication manager 512; all connected via
  f) A data bus 520;
  Wherein the weighing manager 510 communicates with a weight sensor 113 via the input/output 506, and stores a measurement in the memory 504, and the weighing manager communicates with the display via the input/output 506, and the communication manager communicates with a mobile device 410, to transmit measurements and receive commands from the mobile device 410.

In related embodiments, the mobile device 410 can include configurations as:
  a) A mobile app, executing on a mobile device, such as for example an Android phone or iPhone, or any wearable mobile device;
  b) A tablet app, executing on a tablet device, such as for example an Android or iOS tablet device;
  c) A web application, executing in a Web browser;
  d) A desktop application, executing on a personal computer, or similar device;
  e) An embedded application, executing on a processing device, such as for example a smart TV, a game console or other system.

In a related embodiment, the on/off switch 204 can activate and deactivate the system for weight measurement 400 via a connection with the input/output 506 of the measuring control unit 402.

It shall be understood that an executing instance of an embodiment of the system for weight measurement 400, as shown in FIG. 4, can include a plurality of mobile devices 410, which are each tied to one or more measuring control units 402.

Figure 6:
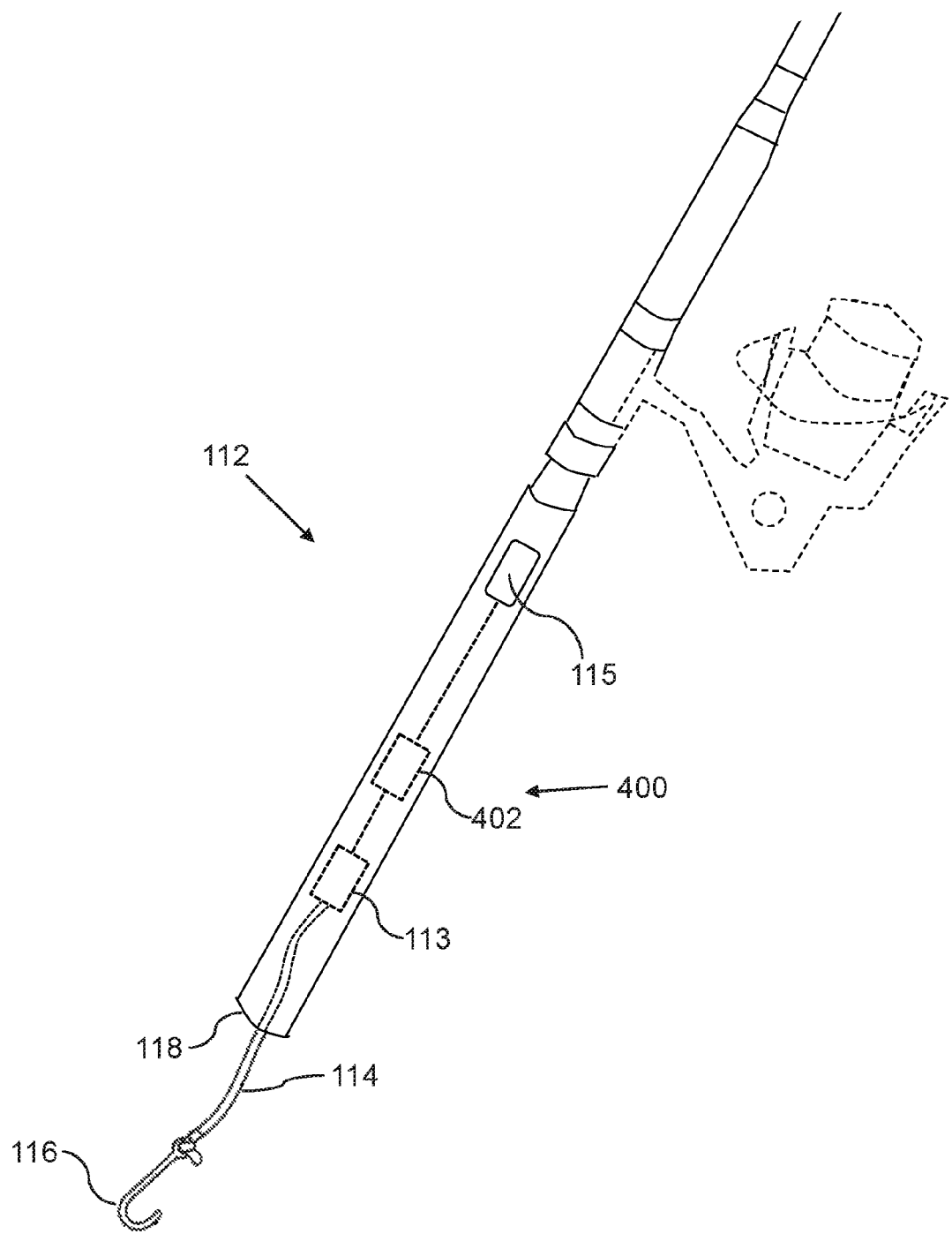
FIG. 6 is a schematic diagram illustrating a part of a fishing rod, according to an embodiment of the invention.

FIG. 6 illustrates an embodiment of the handle 112 of the fishing rod 100, such that the system for weight measurement 400 is a part of the handle 112.

Figure 9:
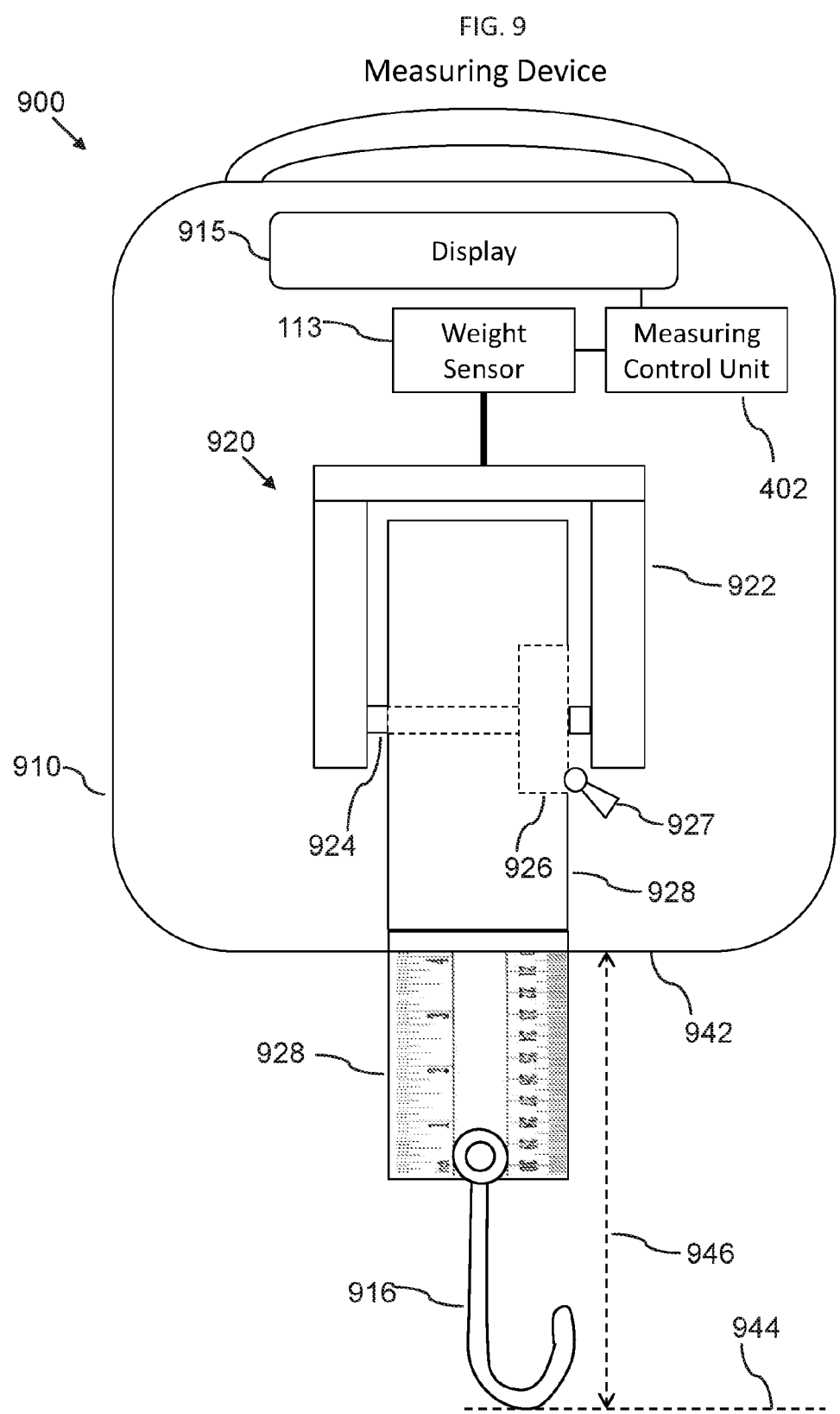
FIG. 9 is a schematic diagram illustrating a measuring device, according to an embodiment of the invention.

In an embodiment, as shown in FIG. 9, a measuring device 900 can include:
a) A device body 910;
b) A digital display 915;
c) A weight sensor 113, which can also be referred to as a load cell 113, which can for example be a strain gauge load cell or a piezoelectric load cell;
d) A measuring control unit 402; which is connected to the weight sensor 113, and can output weight measurement data and other information via a connection to the digital display 915;
e) A measuring assembly 920, which can be configured as a self-retracting tape measure 920, including:
  i. An assembly body 922, which is connected to the weight sensor 113;
  ii. An axle 924, which is rotatably connected to the assembly body 922;
  iii. A spring-loaded mechanism 926, which is attached to the axle 924, such that the spring loaded mechanism 926 further comprises a locking component 927, which is configured to lock or unlock the axle 924, such as commonly used in self-retracting tape measures and retractable cords; and
  iv. A retractable tape measure 928, which is configured to roll-up around the axle 924 when the retractable tape measure 928 is retracted, such that the spring-loaded mechanism 926 is configured to rotate the axle 924, such that the retractable tape measure 928 is retracted when the spring-loaded mechanism is unlocked; wherein the retractable tape measure 928 is locked in position when the spring-loaded mechanism 926 is locked;
f) A weighing hook 916, which is connected to an outer end of the tape measure 928;
wherein the measuring control unit 402 can communicate with a mobile device 410, such that the mobile device can receive input from the measuring control unit 402 and can control functions on the measuring control unit 402;
wherein the measuring control unit 402 is configured to receive the weight measurement from the weight sensor 113, when the fish is hanging from the weighing hook 916 and the spring loaded mechanism 926 is locked;
wherein the tape measure 928 is configured to show a length 946 between a lower end 942 of the device body 910 and a lower end 944 of the weighing hook 916;
whereby the retractable tape measure 928 functions to both weigh and measure a length of the fish.

Figure 10:
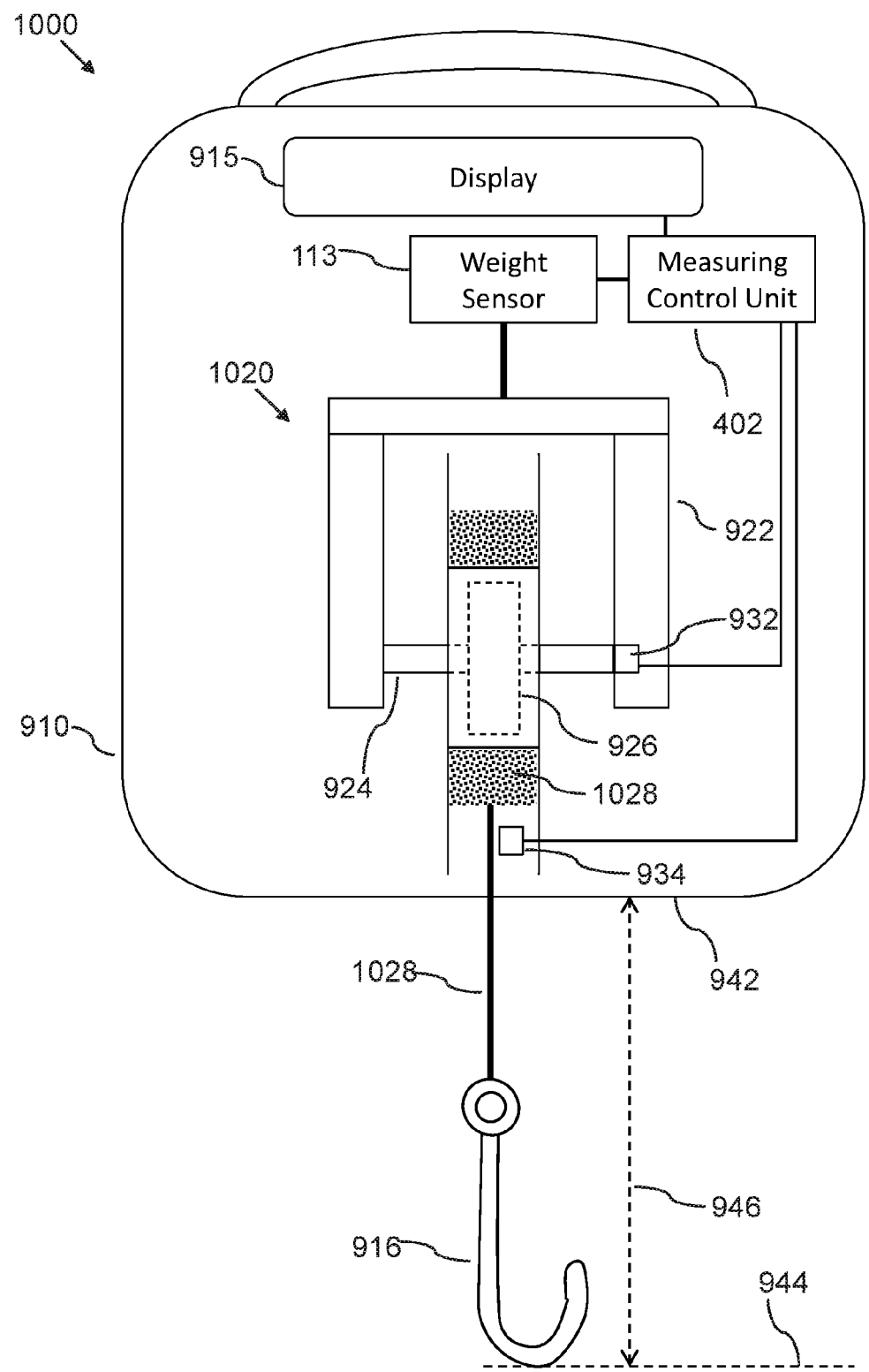
FIG. 10 is a schematic diagram illustrating a measuring device, according to an embodiment of the invention.

In another embodiment, as shown in FIG. 10, a measuring device 1000 can include:
g) A device body 910;
h) A digital display 915;
i) A weight sensor 113;
j) A measuring control unit 402; which is connected to the weight sensor 113, and can output weight measurement data and other information via a connection to the digital display 915;
k) A measuring assembly 1020, which can be configured as a retractable cord 1028 including:

i. An assembly body 922, which is connected to the weight sensor 113;
ii. An axle 924, which is rotatably connected to the assembly body 922;
iii. A spring-loaded mechanism 926, which is attached to the axle 924, such that the spring loaded mechanism 926 further comprises a locking component 927, which is configured to lock or unlock the axle 924, such as commonly used in self-retracting tape measures and retractable cords;
iv. A retractable cord 1028, which is configured to roll-up around the axle 924 when the retractable cord 1028 is retracted, such that the spring-loaded mechanism 926 is configured to rotate the axle 924, such that the retractable cord 1028 is retracted when the spring-loaded mechanism 926 is unlocked;
  wherein the retractable cord 1028 is locked in position when the spring-loaded mechanism 926 is locked; and
v. A cord sensor 932 934, which is configured to measure an extraction length 946 of the cord; and
l) A weighing hook 916, which is connected to an outer end of the retractable cord 1028;
such that the digital display 915, the weight sensor 113, the measuring control unit 402, and the measuring assembly 1020 are mounted in the device body 910;
wherein the measuring control unit 402 can communicate with a mobile device 410, such that the mobile device can receive input from the measuring control unit 402 and can control functions on the measuring control unit 402;
wherein the measuring control unit 402 is configured to receive the weight measurement from the weight sensor 113, when the fish is hanging from the weighing hook 916 and the spring loaded mechanism 926 is locked;
wherein the measuring control unit 402 is configured to communicate with the cord sensor 932 934 to receive the extraction length 946, between a lower end 942 of the device body 910 and a lower end 944 of the weighing hook 916, such that the measuring control unit 402 communicates with the display 915 to show the extraction length 946;
whereby the retractable cord 1028 functions to both weigh and measure a length of the fish.

In related embodiments, the cord sensor 932 can be configured as a rotation sensor 932, such as for example manufactured by Altheris™ Sensor & Control, which is configured to measure a rotation of the axle 924, which is proportional to an extraction length 946, such that the measuring control unit 402 is configured to calculate the extraction length 946 based on the rotation of the axle 924.

In related embodiments, the cord sensor 934 can be configured as an optical sensor 934, which can be a led sensor or a laser sensor, including a light source and a light detector, such as for commonly used in an optical computer mouse, which is configured to measure a movement of the cord 1028, which is directly proportional to an extraction length 946, such that the measuring control unit 402 is configured to calculate the extraction length 946 based on the movement of the cord 1028.

In a related embodiment, a measuring assembly 920 1020 can include:
i. An assembly body 922, which is connected to the weight sensor 113;
ii. An axle 924, which is rotatably connected to the assembly body 922;

iii. A spring-loaded mechanism 926, which is attached to the axle 924, such that the spring loaded mechanism 926 further comprises a locking component 927, which is configured to lock or unlock the axle 924, such as commonly used in self-retracting tape measures and retractable cords; and iv. A retractable hook connector 928 1028, which can be a retractable tape measure 928 or a retractable cord 1028, such that the retractable hook connector 928 1028 is configured to roll-up around the axle 924 when the retractable hook connector 928 1028 is retracted, such that the spring-loaded mechanism 926 is configured to rotate the axle 924, such that the retractable hook connector 928 1028 is retracted when the spring-loaded mechanism 926 is unlocked;

wherein the retractable hook connector 928 1028 is locked in position when the spring-loaded mechanism 926 is locked;

Such that a weighing hook 916 can be attached to an outer end of the retractable hook connector 928 1028.

Figure 11:
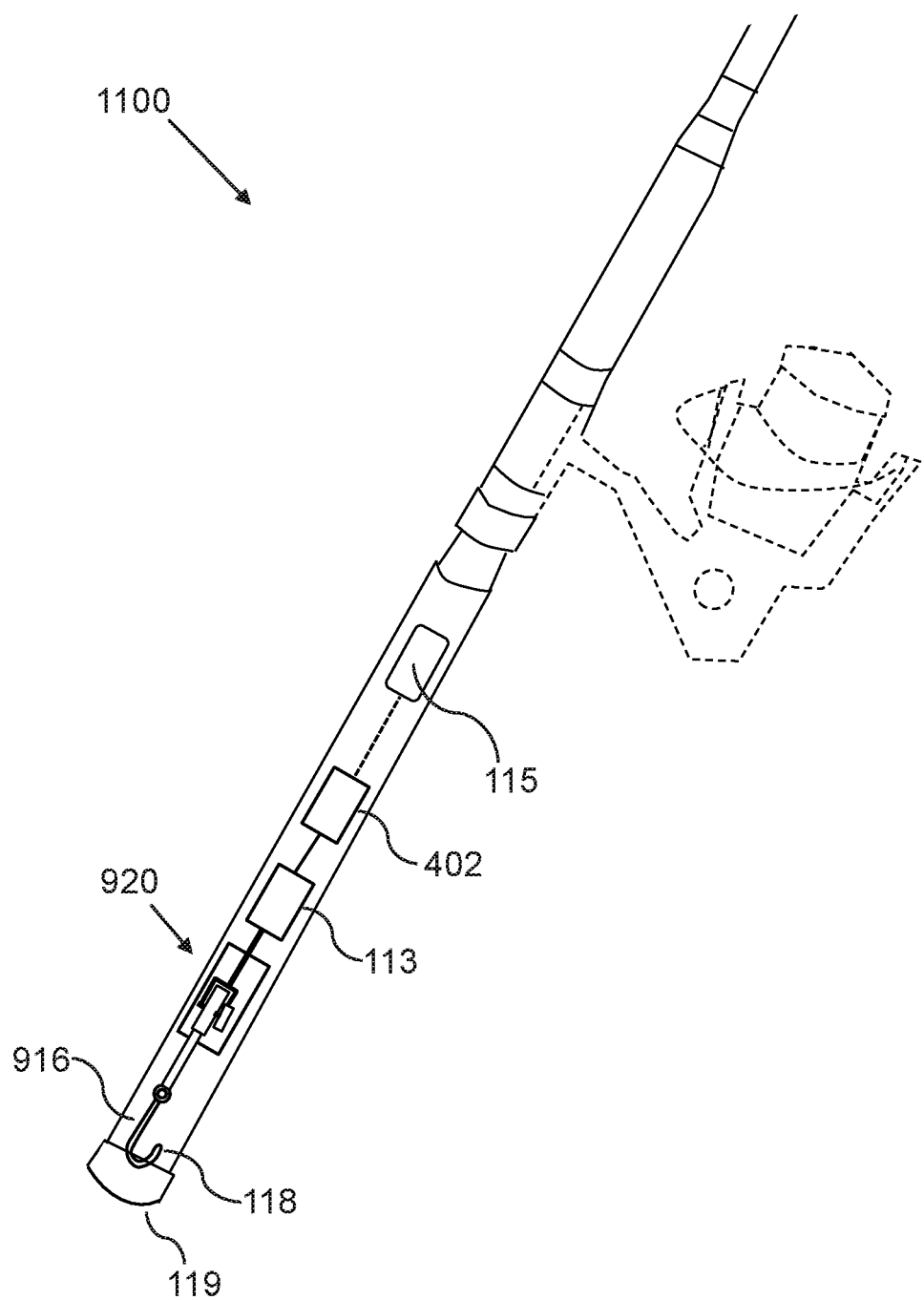
FIG. 11 is a schematic diagram illustrating a part of a fishing rod, according to an embodiment of the invention.
Figure 12:
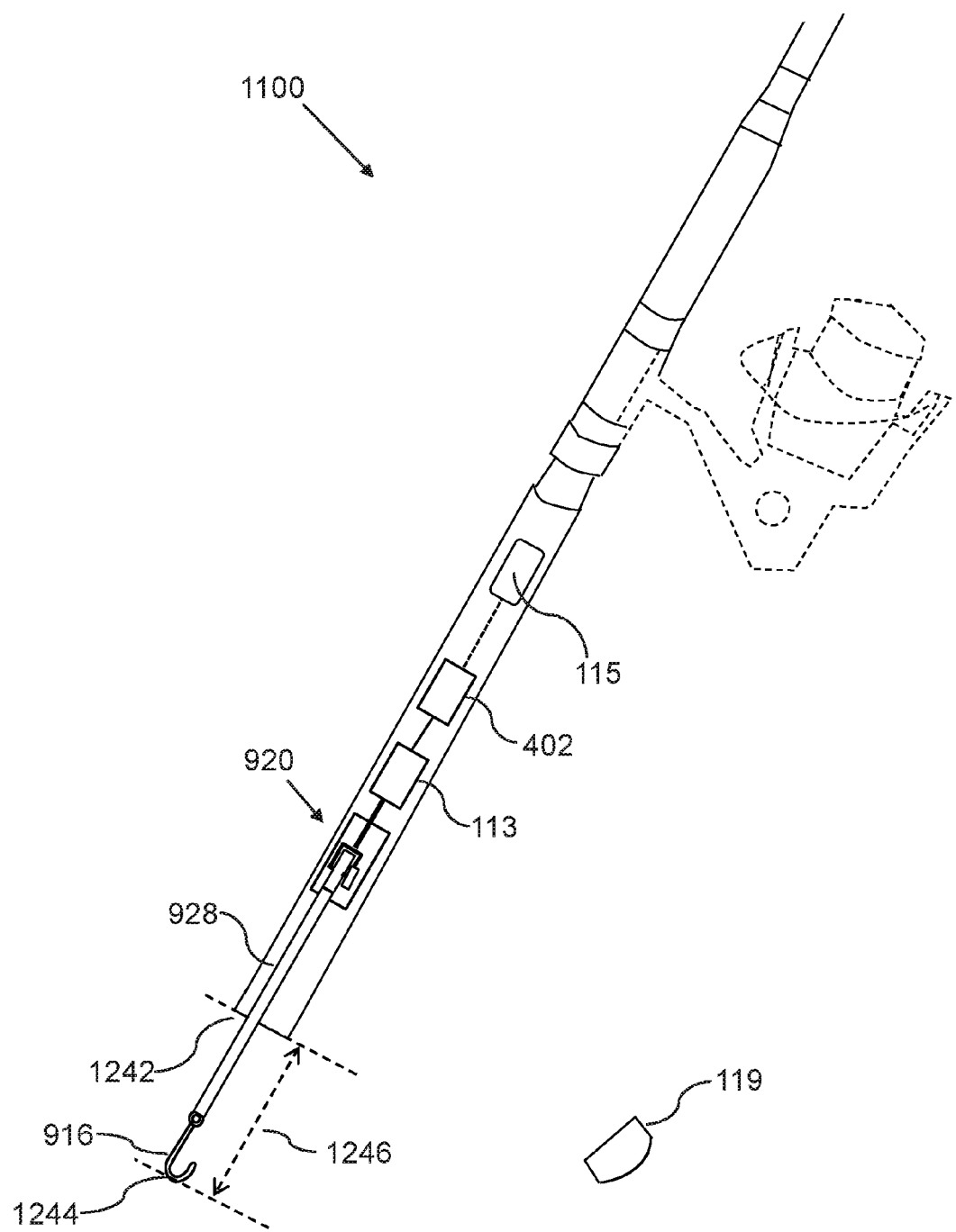
FIG. 12 is a schematic diagram illustrating a part of a fishing rod, according to an embodiment of the invention.

In a related embodiment, as shown in FIG. 11, a fishing rod 1100 can include:

a. A digital display 115;

b. A weight sensor 113;

c. A measuring control unit 402; which is connected to the weight sensor 113, and can output weight measurement data and other information via a connection to the digital display 115;

d. A measuring assembly 920, as shown in FIG. 9, which can be configured as a self-retracting tape measure 920, including:

i. An assembly body 922, which is connected to the weight sensor 113;

ii. An axle 924, which is rotatably connected to the assembly body 922;

iii. A spring-loaded mechanism 926, which is attached to the axle 924, such that the spring loaded mechanism 926 further comprises a locking component 927, which is configured to lock or unlock the axle 924, such as commonly used in self-retracting tape measures and retractable cords; and iv. A retractable tape measure 928, which is configured to roll-up around the axle 924 when the retractable tape measure 928 is retracted, such that the spring-loaded mechanism 926 is configured to rotate the axle 924, such that the retractable tape measure 928 is retracted when the spring-loaded mechanism is unlocked; wherein the retractable tape measure 928 is locked in position when the spring-loaded mechanism 926 is locked;

e. A weighing hook 916, which is connected to an outer end of the tape measure 928;

wherein the measuring control unit 402 can communicate with a mobile device 410, such that the mobile device can receive input from the measuring control unit 402 and can control functions on the measuring control unit 402;

wherein the measuring control unit 402 is configured to receive the weight measurement from the weight sensor 113, when the fish is hanging from the weighing hook 916 and the spring loaded mechanism 926 is locked;

wherein the tape measure 928, as shown in FIG. 12, is configured to show a length 1246 between a lower end 1242 of the fishing rod 1100 and a lower end 1244 of the weighing hook 916, when the retractable tape measure 928 is retracted from the measuring assembly 920.

Figure 13:
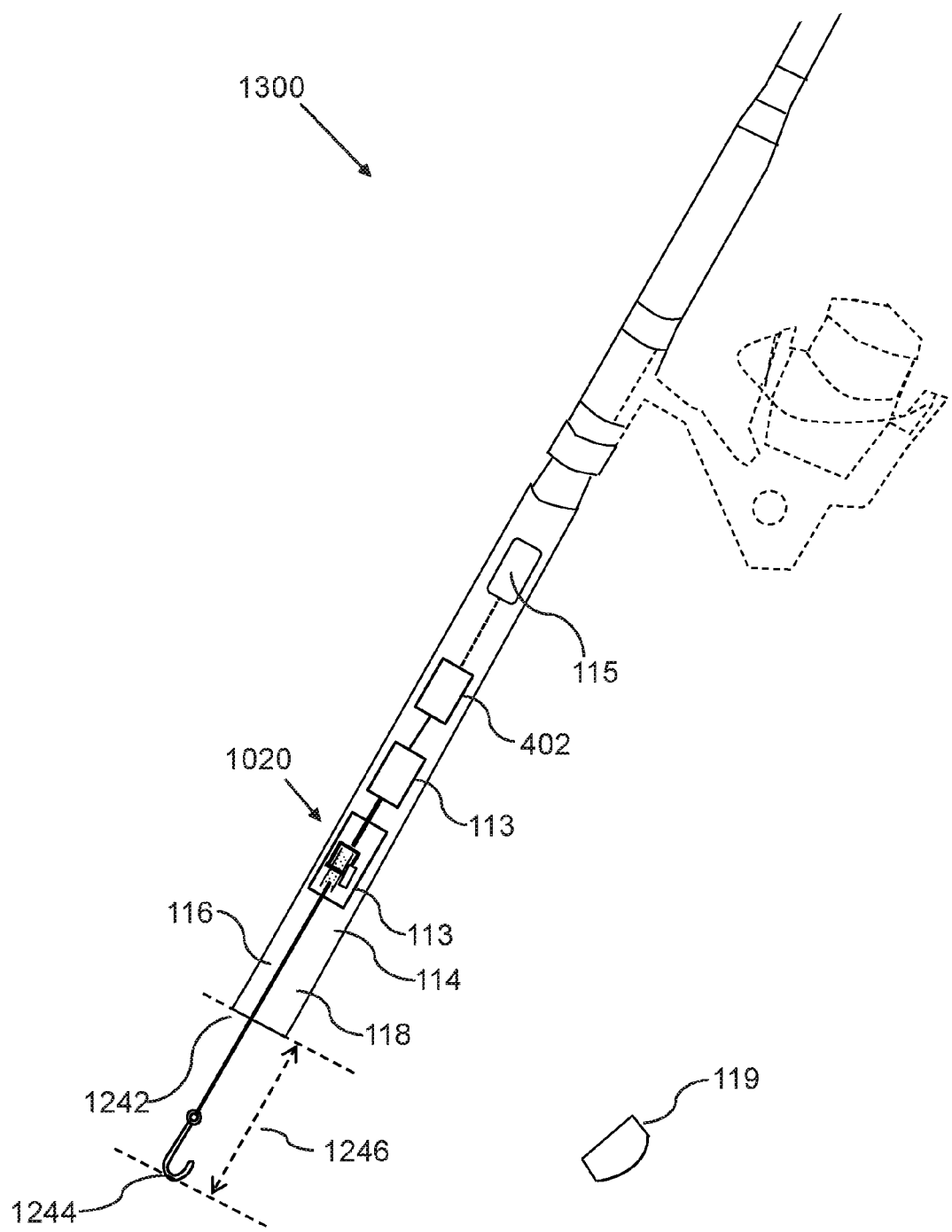
FIG. 13 is a schematic diagram illustrating a part of a fishing rod, according to an embodiment of the invention.

In a related embodiment, as shown in FIG. 13, a fishing rod 1300 can include:

a. A digital display 115;

b. A weight sensor 113;

c. A measuring control unit 402; which is connected to the weight sensor 113, and can output weight measurement data and other information via a connection to the digital display 115;

d. A measuring assembly 1020, which can be configured as a retractable cord 1020, including:

i. An assembly body 922, which is connected to the weight sensor 113;

ii. An axle 924, which is rotatably connected to the assembly body 922;

iii. A spring-loaded mechanism 926, which is attached to the axle 924, such that the spring loaded mechanism 926 further comprises a locking component 927, which is configured to lock or unlock the axle 924, such as commonly used in self-retracting tape measures and retractable cords;

iv. A retractable cord 1028, which is configured to roll-up around the axle 924 when the retractable cord 1028 is retracted, such that the spring-loaded mechanism 926 is configured to rotate the axle 924, such that the retractable cord 1028 is retracted when the spring-loaded mechanism 926 is unlocked;

wherein the retractable cord 1028 is locked in position when the spring-loaded mechanism 926 is locked; and v. A cord sensor 932 934, which is configured to measure an extraction length 946 of the cord;

e. A weighing hook 916, which is connected to an outer end of the retractable cord 1028;

wherein the measuring control unit 402 can communicate with a mobile device 410, such that the mobile device can receive input from the measuring control unit 402 and can control functions on the measuring control unit 402;

wherein the measuring control unit 402 is configured to receive the weight measurement from the weight sensor 113, when the fish is hanging from the weighing hook 916 and the spring loaded mechanism 926 is locked;

wherein the measuring control unit 402 is configured to communicate with the cord sensor 932 934 to receive the extraction length 946, between a lower end 942 of the fishing rood 1100 and a lower end 944 of the weighing hook 916, such that the measuring control unit 402 communicates with the display 115 to show the extraction length 946.

FIGS. 4, 5, and 6 are block diagrams and flowcharts methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 4, 5, and 6 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the system for weight measurement 400 and the measuring control unit 402 are to be interpreted in the most general manner.

For example, the processor 502 can include a single physical microprocessor or microcontroller, a cluster of processors, a datacenter or a cluster of datacenters, a computing cloud service, and the like.

In a further example, the non-transitory memory 504 can include various forms of non-transitory storage media, including random access memory and other forms of dynamic storage, and hard disks, hard disk clusters, cloud storage services, and other forms of long-term storage. Similarly, the input/output 506 can include a plurality of well-known input/output devices, such as screens, keyboards, pointing devices, motion trackers, communication ports, and so forth.

Furthermore, it shall be understood that system for weight measurement 400 and the measuring control unit 402 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the measuring control unit 402 communicates with the digital display 115, the weight sensor 113, and the mobile device 410 over at least one network, which can include a direct wired connection, the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the system for weight measurement 400, such that the measuring control unit 402, executes on the mobile device 410, and communicates with the weight sensor 113 via a wireless connection.

In a further related example embodiment, the display function may also be provided by the mobile device 410, such that there is no digital display 115 in the handle 112.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A fishing rod with convenient devices for measuring a length and a weight of a fish, comprising:
   a) a display;
   b) a weight sensor;

c) a measuring control unit, which is connected to the weight sensor and the display, such that the measuring control unit is configured to output a weight measurement in communication with the display;
d) a measuring assembly, comprising:
   an assembly body, which is connected to the weight sensor;
   an axle, which is rotatably connected to the assembly body; and
   a retractable hook connector, which is configured to roll-up around the axle when the retractable hook connector is retracted; and
e) a weighing hook, which is connected to an outer end of the retractable hook connector;
wherein the fishing rod further comprises a handle, such that the display, the weight sensor, the measuring control unit, and the measuring assembly are mounted in the handle;
wherein the measuring control unit is configured to receive the weight measurement from the weight sensor, when the fish is hanging from the weighing hook;
wherein the retractable hook connector is configured to show a length between a lower end of the fishing rod and a lower end of the weighing hook.

2. The fishing rod of claim 1, wherein the measuring assembly further comprises a spring-loaded mechanism, which is attached to the axle, such that the spring loaded mechanism further comprises a locking component, which is configured to lock or unlock the axle, such that the spring-loaded mechanism is configured to rotate the axle, such that the retractable hook connector is retracted when the spring-loaded mechanism is unlocked.

3. The fishing rod of claim 1, wherein the retractable hook connector is a retractable tape measure, which comprises length measurement markings, such that the retractable tape measure is configured to show a length between a lower end of the fishing rod and a lower end of the weighing hook, when the retractable tape measure is extracted from the measuring assembly.

4. The fishing rod of claim 1, wherein the measuring assembly further comprises:
   a cord sensor;
   wherein the retractable hook connector is a retractable cord;
   wherein the measuring control unit is configured to communicate with the cord sensor to receive an extraction length, between a lower end of the fishing rod and a lower end of the weighing hook, such that the measuring control unit communicates with the display to show the extraction length, when the retractable cord is extracted from the measuring assembly.

5. The fishing rod of claim 4, wherein the cord sensor is configured as a rotation sensor, which is configured to measure a rotation of the axle, such that the rotation is proportional to the extraction length, such that the measuring control unit is configured to calculate the extraction length based on the rotation of the axle.

6. The fishing rod of claim 4, wherein the cord sensor is configured as an optical sensor, which is configured to measure a movement of the cord, such that the movement is directly proportional to the extraction length, such that the measuring control unit is configured to calculate the extraction length based on the movement of the cord.

7. The fishing rod of claim 1, further comprising a cavity in the handle, such that the weighing hook is stored in the cavity, such that the weighing hook and the retractable hook connector are extended from the cavity when needed to weigh the fish.

8. The fishing rod of claim 7, further comprising a cap, such that the cap closes the cavity, when the weighing hook is stored in the cavity.

9. The fishing rod of claim 1, wherein the handle is detachable, such that the handle attaches to an elongated member of the fishing rod with the handle attachment mechanism.

10. The fishing rod of claim 1, wherein the measuring control unit further comprises:
    a) a processor;
    b) a non-transitory memory;
    c) an input/output; and
    d) a weighing manager; all connected via
    e) a data bus;
    wherein the weighing manager communicates with the weight sensor via the input/output, and stores a weight measurement in the memory.

11. The fishing rod of claim 10, wherein the measuring control unit further comprises a communication manager, which is connected via the data bus, such that the communication manager is configured to communicate with a mobile device, to transmit measurements and receive commands from the mobile device.

12. The fishing rod of claim 11, wherein the communication manager is configured to communicate with the mobile device via a wireless connection.

13. A measuring device with convenient features for measuring a length and a weight of a fish, comprising:
    a) a device body;
    b) a display;
    c) a weight sensor;
    d) a measuring control unit, which is connected to the weight sensor and is configured to output a weight measurement in communication with the display;
    e) a measuring assembly, comprising:
       an assembly body, which is connected to the weight sensor;
       an axle, which is rotatably connected to the assembly body; and
       a retractable hook connector, which is configured to roll-up around the axle when the retractable hook connector is retracted; and
    f) a weighing hook, which is connected to an outer end of the retractable hook connector;
    such that the display, the weight sensor, the measuring control unit, and the measuring assembly are mounted in the device body;
    wherein the measuring control unit is configured to receive the weight measurement from the weight sensor, when the fish is hanging from the weighing hook;
    wherein the retractable hook connector, is configured to show a length between a lower end of the device body and a lower end of the weighing hook.

14. The measuring device of claim 13, wherein the measuring assembly further comprises a spring-loaded mechanism, which is attached to the axle, such that the spring loaded mechanism further comprises a locking component, which is configured to lock or unlock the axle, such that the spring-loaded mechanism is configured to rotate the axle, such that the retractable hook connector is retracted when the spring-loaded mechanism is unlocked.

15. The measuring device of claim 13, wherein the retractable hook connector is a retractable tape measure, which comprises length measurement markings, such that the retractable tape measure is configured to show a length between a lower end of the device body and a lower end of the weighing hook, when the retractable tape measure is extracted from the measuring assembly.

16. The measuring device of claim 13, wherein the measuring assembly further comprises:
   a cord sensor;
   wherein the retractable hook connector is a retractable cord;
   wherein the measuring control unit is configured to communicate with the cord sensor to receive an extraction length, between a lower end of the device body and a lower end of the weighing hook, such that the measuring control unit communicates with the display to show the extraction length, when the retractable cord is extracted from the measuring assembly.

17. The measuring device of claim 16, wherein the cord sensor is configured as a rotation sensor, which is configured to measure a rotation of the axle, such that the rotation is proportional to the extraction length, such that the measuring control unit is configured to calculate the extraction length based on the rotation of the axle.

18. The measuring device of claim 16, wherein the cord sensor is configured as an optical sensor, which is configured to measure a movement of the cord, such that the movement is directly proportional to the extraction length, such that the measuring control unit is configured to calculate the extraction length based on the movement of the cord.

19. The measuring device of claim 13, wherein the measuring control unit further comprises:
   a) a processor;
   b) a non-transitory memory;
   c) an input/output; and
   d) a weighing manager; all connected via
   e) a data bus;
   wherein the weighing manager communicates with the weight sensor via the input/output, and stores a weight measurement in the memory.

20. The measuring device of claim 19, wherein the measuring control unit further comprises a communication manager, which is connected via the data bus, such that the communication manager is configured to communicate with a mobile device, to transmit measurements and receive commands from the mobile device.

* * * * *